United States Patent Office 3,151,883
Patented Oct. 6, 1964

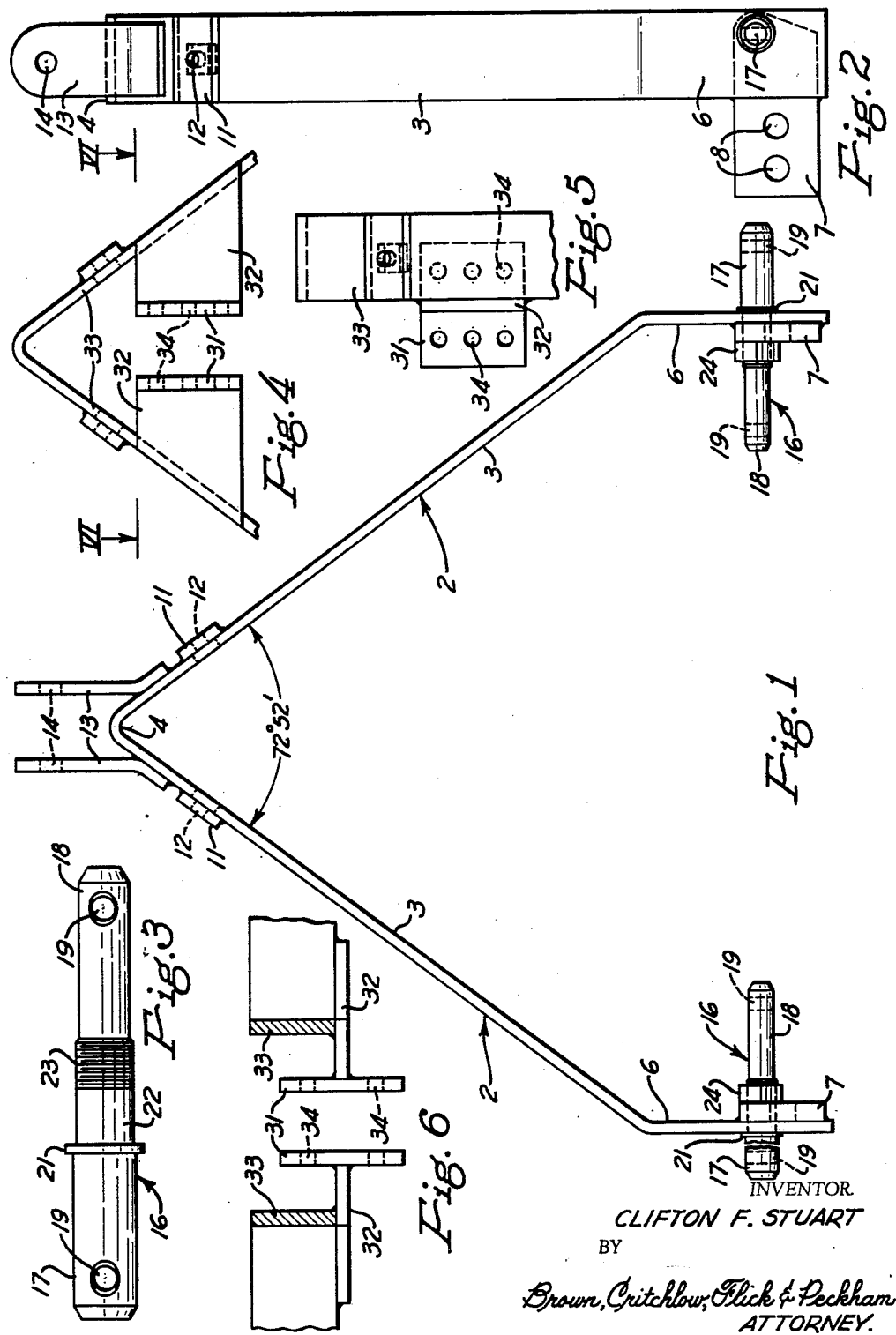

3,151,883
IMPLEMENT HITCH
Clifton F. Stuart, 1101 Woodbine St. SE., Warren, Ohio
Filed Aug. 14, 1962, Ser. No. 216,026
4 Claims. (Cl. 280—415)

This invention relates generally to, and has for its object the provision of, an implement hitch for connecting an implement to a tractor that is provided with any one of a variety of hitch systems, including either (1) a three-point hitch of the type commonly referred to as the Ferguson system; (2) a male hitch member of the "Insta-Hitch" type, as described in Patent 3,029,092 issued to the present applicant; or (3) a "Quik-Coupler" hitch of the type currently made and sold by John Deere Company.

In the Ferguson system, the tractor has three outwardly extending links. Two of them (the bottom links) lie substantially in the same horizontal plane for pulling and guiding the implement, and the third (or top) link is centrally disposed above the bottom links and controls the forward tilt of the implement. All three links may be raised and lowered; and the rear end of each link is provided with a ball and socket member to which the implement is attached by pins to provide a three-point hitch. Some of these hitches have bottom links that accept pins of one diameter (⅞ inch) and others pins of larger diameter (1⅛ inches).

In a second hitch system, which is described in Patent 3,029,092 and which is sold under the trademark "Insta-Hitch," the tractor is provided with a male frame member that can be raised and lowered or tilted forwards and backwards, as, for example, by attaching it to the links of a three-point system. The male frame member has side portions converging upwardly to a top, each side portion constituting an outwardly facing aligning surface. A hook adjacent the top of the member extends upwardly and away from the tractor. A complementary female frame member, which is generally permanently attached to the implement, includes two opposed upwardly converging side portions, each of which conforms to the convergence of the side portions of the male member and provides an inwardly facing aligning surface adapted to receive and overlap the corresponding aligning surface of the male member. These two frames are interconnected by passing the hook of the male member through the female member and thereafter raising the top of the male member to guide the female member into nesting relation on the male member with the aligning surfaces of the two members in lapping engagement. Releasable locking means secured to one of the members are adapted to lock the lower ends of the two members in nested relation.

The John Deere coupler, sold under the trademark "Quik Coupler" includes two separate frame members, one of which is attached to the three-point system of a tractor and the other to the implement. The tractor frame member has a rearwardly extending hook adapted to engage the top of a mast on the implement frame member and means are provided for locking together the bottoms of the frame members. This hitch conforms generally to that described in Hess Patent 2,979,137.

The present invention will be described in connection with the attached drawings, in which;

FIG. 1 is a front elevation of an implement hitch frame usable with the three-point system (both pin sizes), as well as with the "Insta-Hitch" system;

FIG. 2 is a side elevation of the frame of FIG. 1;

FIG. 3 is an enlarged detail of one of the reversible pins mounted on the bottom of the frame;

FIG. 4 is a front elevation of a modification of the upper portion of the frame of FIG. 2, adapting that frame for use with the John Deere "Quik-Coupler" hitch, as well as with all of the other tractor mounted systems enumerated above;

FIG. 5 is a side elevation of the modification of FIG. 4; and

FIG. 6 is a horizontal section along the line VI—VI of FIG. 4.

In accordance with this invention, the implement hitch member includes a frame having two opposed side portions, the upper parts of which are upwardly convergent and conform in length an angle of convergence to the converging side portions of an "Insta-Hitch" male frame member. Supported by these side portions adjacent the top of the frame are a pair of spaced parallel flanges with pin receiving holes therethrough (for attaching, for example, the upper link of a three-point hitch or for holding a pin engageable by the hook of "Quik-Coupler"). The lower ends of each side portion, below the upper converging portions, are substantially parallel, and mounted thereon are special reversible pins, which extend horizontally. One end of each reversible pin has a diameter that is accepted by one size of three-point hitch (and by the latch of the "Quik-Coupler"), and the other end has a different diameter accepted by the other common size of three-point hitch. When the hitch is used with the three-point or "Quik-Coupler" systems, the pins are mounted with the end of appropriate diameter extending outwardly from the lower side portions of the frame. One of the pin end diameters is also of the right size and length to act as a locking bar in conjunction with the latching means used on the "Insta-Hitch" male member, and when so used, this end of the pin extends inwardly from the lower side portions.

Referring to the drawings, the implement hitch frame member shown in FIG. 1 includes side portions 2, the upper parts 3 of which converge upwardly to an apical top portion 4. The lower parts 6 of the side portions extend vertically downward; and to their bottom inner surfaces are welded rearwardly extending lugs 7 provided with holes 8, for joining the bottom of the frame to horizontally spaced points on a farm implement or the like (not shown). To the outer faces of the converging upper side portions 3 adjacent the top of the frame are welded pads 11; and a hole 12 is drilled through each pad and the underlying portion of the frame, providing means for attaching the mast or other upper portion of the implement to the frame. The frame is thereby secured to the implement, so that, when the latter is in use, the plane of the frame will be generally vertical.

To make this frame usable with a three-point tractor hitch system, means are provided for securing the upper link of such a system to the frame adjacent its top. One such means is shown in FIG. 1 in the form of spaced parallel upstanding lugs 13 with transverse holes 14 therethrough. The lower links of the three-point system are secured to the bottom of the frame by means of reversible pins 16. One end 17 of each pin 16 has a diameter of 1⅛ inches and the other end 18 a diameter of ⅞ inch, these being the pin diameters acceptable by the lower links on the two most common types of three-point hitch. A hole 19 is drilled through each end of each pin to receive a cotter pin (not shown) for holding the link on the pin. The central portion of each pin 16 includes a collar or flange 21 and a bearing portion 22 adjacent thereto. The latter has substantially the same length as the thickness of the bottom portion 6 of the frame, plus the thickness of the rearwardly extending lug 7 attached to the frame and through which the pin also passes. A threaded portion 23 adjacent the bearing portion permits the pin to be secured rigidly to the frame member by a nut 24. In FIG. 1, the pins are mounted with their ends of larger diameter extending laterally outward from the frame. In this position, they are adapted to be used with the larger of the two common sizes of three-point hitch. By reversing the position of each pin in the frame, it is immediately ready for use with the smaller of the two sizes.

When the position of the pins in FIG. 1 is reversed as explained above (with the larger pin ends 17 extending inwardly), the frame is adapted for use with the "Insta-Hitch" system, wherein it performs the function of the female member of the "Insta-Hitch" combination. When so used, the frame member of FIG. 1 overlaps the male "Insta-Hitch" member and the locking dogs on the latter engage the pins at the bottom of the frame. To assure a conforming fit with the "Insta-Hitch" male frame member as it is presently manufactured, the angle between the converging side portions should be 72° 52′, as indicated in FIG. 1, the length of the converging side portions should be approximately 24 inches, and the vertical distance between the center line of the pins and the apex or top of the frame should be approximately 22¾ inches.

The modification of the upper portion of the frame shown in FIGS. 4–6 permits the frame to be used not only with the three-point system and the "Insta-Hitch" system, but also with the John Deere "Quik-Coupler" system. In this modification, the upwardly extending lugs 13 of FIG. 1 are replaced by spaced parallel flange plates 31 welded to web members 32 that are, in turn, welded adjacent the top of the frame to edges 33 remote from the tractor. These flange plates extend both in front of and behind the web members, and each of the front and rear portions are provided with vertically spaced, aligned holes 34. The rear sets of holes being usable, if found convenient, for attaching the frame to the implement, while the front sets of holes will accommodate a pin (not shown) either for attaching the upper link of a three-point system or for engaging the hook of a John Deere "Quik-Coupler." This same modification is also usable by the "Insta-Hitch" system, the hook on the male member passing between flange plates 31 or in front of and above them.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. An implement hitch frame member comprising a pair of opposed side portions, the upper parts of which converge upwardly to an apical top portion and the lower parts of which extend downwardly in substantially parallel relation to each other, a reversible pin member extending laterally through an opening in the lower part of each side portion, one end of the pin member consisting of a first pin portion of given diameter extending outwardly from the side portion and the other end of the pin member consisting of a second pin portion of different diameter than the first pin portion and extending inwardly from the side portion, the first and second pin portions being separated by a bearing portion adapted to engage and be supported by the edge of said opening, means adjacent one side of the bearing portion for limiting axial movement of the pin member in one direction through said opening, and a threaded portion on the other side of the bearing portion for receiving a locking nut for removably securing the pin member in said opening.

2. An implement hitch according to claim 1 that also includes a link receiving means supported by the converging upper parts of the side portions adjacent the top portion, said means being adapted to receive and engage the upper link of a tractor mounted three-point hitch.

3. An implement hitch in accordance with claim 2, in which said link receiving means comprises two upstanding and substantially parallel lugs mounted on the outer sides of the upper parts of the side portions and extending above the top portion.

4. An implement hitch according to claim 2, in which said link receiving means comprises a pair of spaced vertically extending parallel flanges mounted on web members secured to the inner sides of the converging upper parts of the side portions below the top portion.

References Cited in the file of this patent

UNITED STATES PATENTS

| | | |
|---|---|---|
| 2,888,995 | Sorensen | June 2, 1959 |
| 2,979,137 | Hess | Apr. 11, 1961 |
| 3,029,092 | Stuart | Apr. 10, 1962 |

FOREIGN PATENTS

| | | |
|---|---|---|
| 219,711 | Australia | Jan. 19, 1959 |
| 844,925 | Great Britain | Aug. 17, 1960 |